United States Patent
Yokokawa et al.

(10) Patent No.: US 11,996,066 B2
(45) Date of Patent: May 28, 2024

(54) ALPHA VALUE USE TO RENDER IMAGES ON TRANSPARENT DISPLAY WITH COLORS PERCEPTIBLE TO A PERSON

(71) Applicant: Sony Interactive Entertainment Inc., Tokyo (JP)

(72) Inventors: Yutaka Yokokawa, San Mateo, CA (US); Jeffrey R. Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 423 days.

(21) Appl. No.: 16/742,200

(22) Filed: Jan. 14, 2020

(65) Prior Publication Data
US 2021/0217378 A1   Jul. 15, 2021

(51) Int. Cl.
*G09G 5/02* (2006.01)
*G02B 27/01* (2006.01)
*G09G 3/36* (2006.01)

(52) U.S. Cl.
CPC ......... *G09G 5/026* (2013.01); *G02B 27/0172* (2013.01); *G09G 3/3607* (2013.01); *G02B 2027/0178* (2013.01); *G09G 2310/0291* (2013.01); *G09G 2340/06* (2013.01)

(58) Field of Classification Search
CPC .................................................. G09G 5/026
See application file for complete search history.

(56) References Cited

U.S. PATENT DOCUMENTS

| | | | | |
|---|---|---|---|---|
| 2007/0171329 A1* | 7/2007 | Freeman | ................ | G02B 27/28 349/65 |
| 2011/0292069 A1* | 12/2011 | Witt | ..................... | H04N 1/6011 345/590 |
| 2013/0120472 A1* | 5/2013 | Byun | ....................... | G09G 5/02 345/690 |
| 2013/0162673 A1* | 6/2013 | Bohn | ................. | G02B 27/0172 345/633 |
| 2017/0301288 A1* | 10/2017 | Perdices-Gonzalez | ..................... | G09G 3/348 |
| 2020/0020138 A1* | 1/2020 | Smith | ..................... | G06F 3/013 |
| 2021/0339143 A1* | 11/2021 | Bar-Zeev | ................ | G06F 3/017 |
| 2021/0389590 A1* | 12/2021 | Freeman | ................ | G09G 5/377 |

OTHER PUBLICATIONS

"Karl Guttag on Technology", Oct. 14, 2019, retrieved from https://www.kguttag.com/2019/10/14/busting-sonys-ghostbusters-ar-display-and-a-little-sprite-history/.

* cited by examiner

*Primary Examiner* — William Boddie
*Assistant Examiner* — Alecia D English
(74) *Attorney, Agent, or Firm* — John L. Rogitz (57) ABSTRACT

Alpha values from an image frame buffer are used to control one or more of a transparent display and an occlusion screen adjacent to the transparent display to render images with coloring perceptible to a person viewing the transparent display.

20 Claims, 5 Drawing Sheets

ALPHA VALUE USE TO RENDER IMAGES ON TRANSPARENT DISPLAY WITH COLORS PERCEPTIBLE TO A PERSON

FIELD

The application relates generally to technically inventive, non-routine solutions that are necessarily rooted in computer technology and that produce concrete technical improvements.

BACKGROUND

As understood herein, augmented reality (AR) display systems such as glasses and headsets overlay graphics onto a real world view. The overlaid graphics include opaque regions (to convey graphic/virtual objects to the view of the wearer) and transparent regions (to allow the wearer to see the real world through the display). To this end, a conventional frame buffer may provide for plural bits of color (red-green-blue, or "RGB") along with other values, colloquially referred to as "alpha", used by developers for alpha blending and optical effects. For example, a frame buffer may provide for 24 bits of RGB data and 8 bits of alpha data, it being understood that different divisions of the frame buffer may be used, e.g., 30 bits RGB 2 bits alpha, or 16 bits for "float" RGBA, etc.

In any case, as understood herein, computer graphics rendering assumes an opaque screen such as a flat-screen television, meaning that with computer graphics rendering there is no adequate way to apply only desired transparency to the display/computer graphics. Moreover, alpha data is simply ignored during the encoding process for presenting the computer graphics. A problem thus arises in that opaque black (e.g., RGB=0, A=1) effectively equals complete transparency (e.g., RGB=0, A=0) because the alpha (A) portion is ignored. Thus when displayed on an AR glass or headset where colors are applied additive to the real world, black=transparent, even though the application may have the intention to distinguish between black and pure transparency.

SUMMARY

Accordingly, in one aspect an augmented reality (AR) display system includes at least one display and at least one processor configured with instructions. When executed by the processor, the instructions configure the processor to receive at least a first red-green-blue (RGB) frame buffer, generate a final RGB data structure by multiplying the first RGB frame buffer by at least a first offset value, and present on the display graphic information according to the final RGB data structure.

The first offset value may include at least an offset addition that is added to a luminosity of at least a first pixel. For example, the first offset value may be given by $f(A)=t((A-A\_offset)/(1-A\_offset))$, where A_offset is/includes the offset addition, A is/includes an alpha value in the first RGB frame buffer, and t is a curve function. In some particular examples, t may include a gamma curve function.

The instructions may also be executable to generate the final RGB data structure by multiplying the first RGB frame buffer by the sum of the first offset value and a second offset value. In some examples, the second offset value g(A) is given by A multiplied by A_offset, where A is an alpha value of at least a first pixel and A_offset is an addition that is added to a luminosity of the first pixel responsive to identifying that the first pixel is not completely opaque.

In some implementations, for at least a first pixel in the first frame buffer RGB information may represent opaque black with RGB=0 and A=1, where A includes an alpha value and where a luminosity of the final RGB data structure for the first pixel is equal to an offset from the alpha value.

Also in some implementations, the processor may include at least one graphics processing unit (GPU). Also in some implementations, the processor may include at least one an application-specific integrated circuit (ASIC) and/or a field-programmable gate array (FPGA).

Still further, in some example embodiments the AR display system may include an occlusion screen that includes pixels that are controllable to transition at least a portion of the occlusion screen between transparent and opaque. In these examples, the instructions may be executable to generate an occlusion screen data structure based on the first offset value and control the occlusion screen according to the occlusion screen data structure. Thus, in some implementations the occlusion screen data structure may be controlled to block light from passing orthogonally from outside the occlusion screen through portions of the at least one display that represent black coloring of the final RGB data structure.

In another aspect, a method includes identifying, at a device including a transparent display, a weight by which at least a first red-green-blue (RGB) value of a frame buffer is to be adjusted. The weight is identified based on an alpha value indicated in the frame buffer, with the alpha value being related to whether at least a portion of a first image to be presented on the transparent display is to represent black coloring. The method also includes adjusting at least the first RGB value based on the weight and rendering, on the transparent display, the first image according to the adjusted first RGB value.

In some implementations, the first RGB value may be adjusted to render black coloring as gray coloring.

Also in some implementations, the device may include an occlusion screen different from the transparent display. In these implementations, the method may include controlling the occlusion screen to block at least some light from passing through the occlusion screen during rendering of the first image using the adjusted first RGB value.

In still another aspect, an apparatus includes at least one computer storage that is not a transitory signal. The computer storage includes instructions executable by at least one processor to identify an alpha value related to presentation of at least a first image. The alpha value is identified at least in part from a frame buffer. The instructions are also executable to, based on the alpha value, control one or more of a transparent display of a device and an occlusion screen of the device to render the first image at the device with coloring perceptible to a person using the device.

In some examples, the apparatus may include the transparent display and comprising the occlusion screen. Also in some examples, the apparatus may include the at least one processor, with the at least one processor dedicated to executing the instructions and being separate from both a central processing unit (CPU) of the device and graphics processing unit (GPU) of the device.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc.

Figure 1:
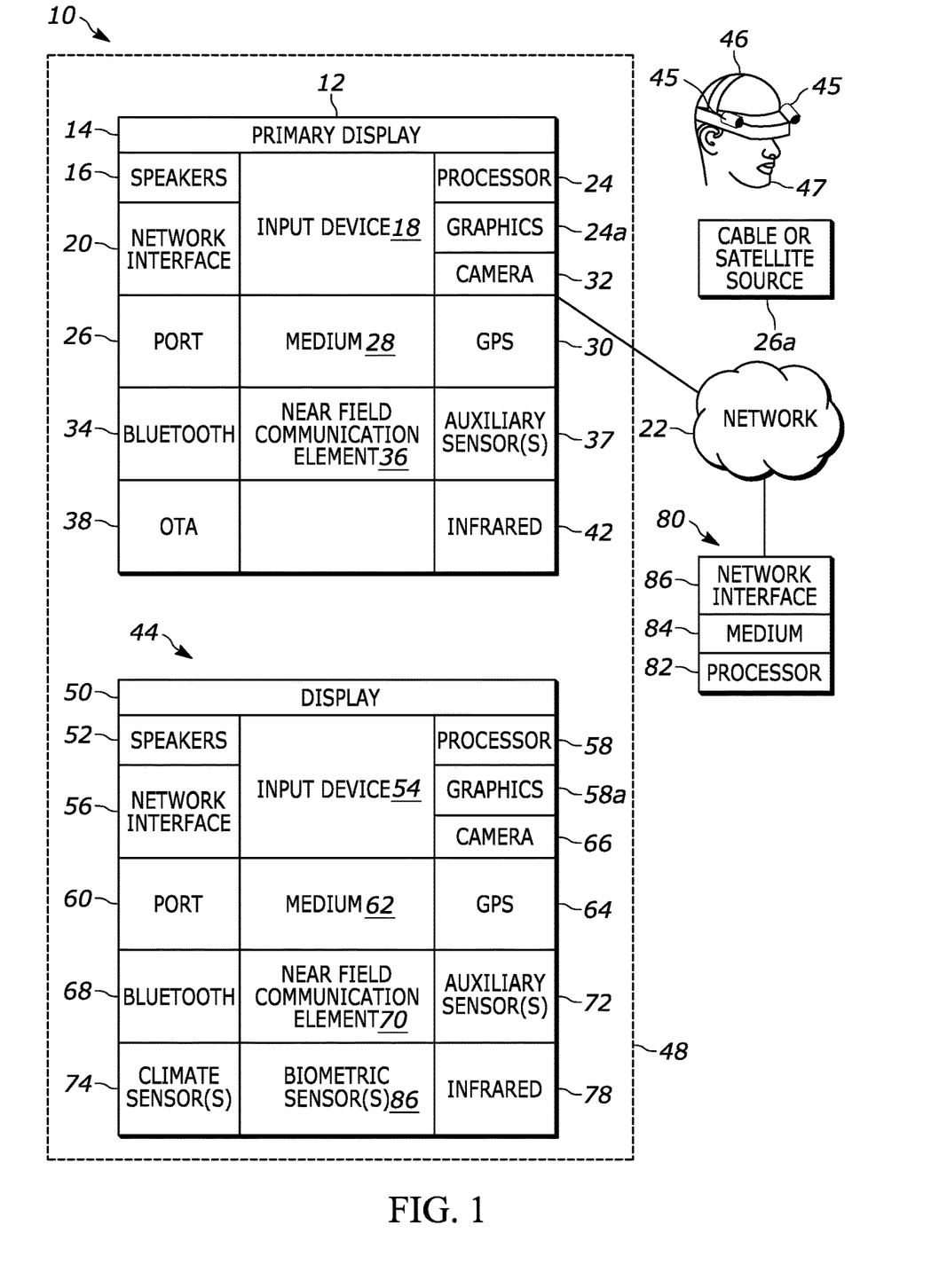
FIG. 1 is a block diagram of an example system including an example consistent with present principles.

The AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an augmented reality (AR) headset worn by the user 47 as shown. The headset 46 may be established by electronic glasses or a virtual reality (VR)-type headset that has a transparent display rather than an opaque display. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. For example, the CE device 46 may include outward-facing cameras 45 on either side of the CE device 46 and oriented in the front-facing direction of the CE device 46 itself to gather images similar to the field of view of the person/user 47 himself or herself. Either one or both CE devices may be powered by one or more batteries.

Now in reference to the afore-mentioned at least one server 80, it may include at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
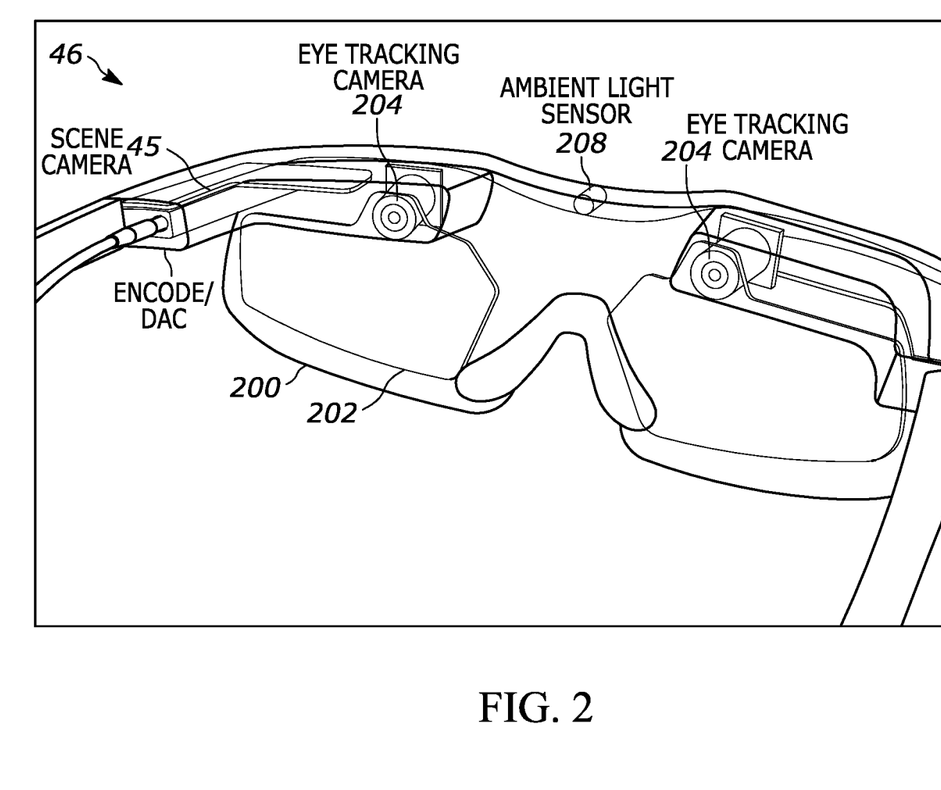
FIG. 2 is a side elevational view of a cross-section of a consumer electronics device consistent with present principles.

Now referring to FIG. 2, it shows a side elevational view of a cross-section of the CE device 46, which again may be an AR headset and/or "smart" glasses. As shown, the CE device 46 may include both an occlusion screen 200 that does not emit light and a transparent video display 202 on which virtual images are presentable by emitting light. The occlusion screen 200 may be used to block light from passing through the occlusion screen 200 on a pixel-by-pixel basis consistent with present principles. Thus, in some examples the occlusion screen 200 may include plural pixels of liquid crystals and polarizers, with each pixel controllable individually by a processor within the device 46 to allow and disallow light from passing through the individual pixels when current is applied or not applied to the pixel, respectively. In some examples, the occlusion screen 200 may also render RGB colors and/or render monochrome black or gray coloring to block light consistent with present principles. Other suitable light-occluding devices besides on LCD screen may also be used to block light consistent with present principles.

The CE device 46 may also include one or more "scene" cameras 45 as described above that may image a field of view similar to that seen by a person himself or herself while wearing the device 46. Additionally, the CE device 46 may include one or more inward-facing cameras 204 oriented to image the person's eyes while the person wears the device 46 so that eye tracking may be performed to determine both the size of the person's pupils as well as the direction and depth of gaze in the field of view. Still further, the CE device 46 may include an encoder and/or digital to analog converter 206 to render virtual images onto the transparent display 202 that are indicated in a frame buffer provided by a graphics processing unit (GPU) on the device 46 or elsewhere. The GPU may have generated the frame buffer itself and placed it in random-access memory (RAM) after first accessing a video or image file streamed over the Internet or accessed in local storage and then processing the video/file for display presentation.

As also shown in FIG. 2, the CE device 46 may also include an ambient light sensor and/or silicon photodiode 208 to sense ambient light in the surroundings of the CE device 46. Additional components that might be included on the CE device 46 will be discussed further below in reference to FIG. 6.

Figure 3:
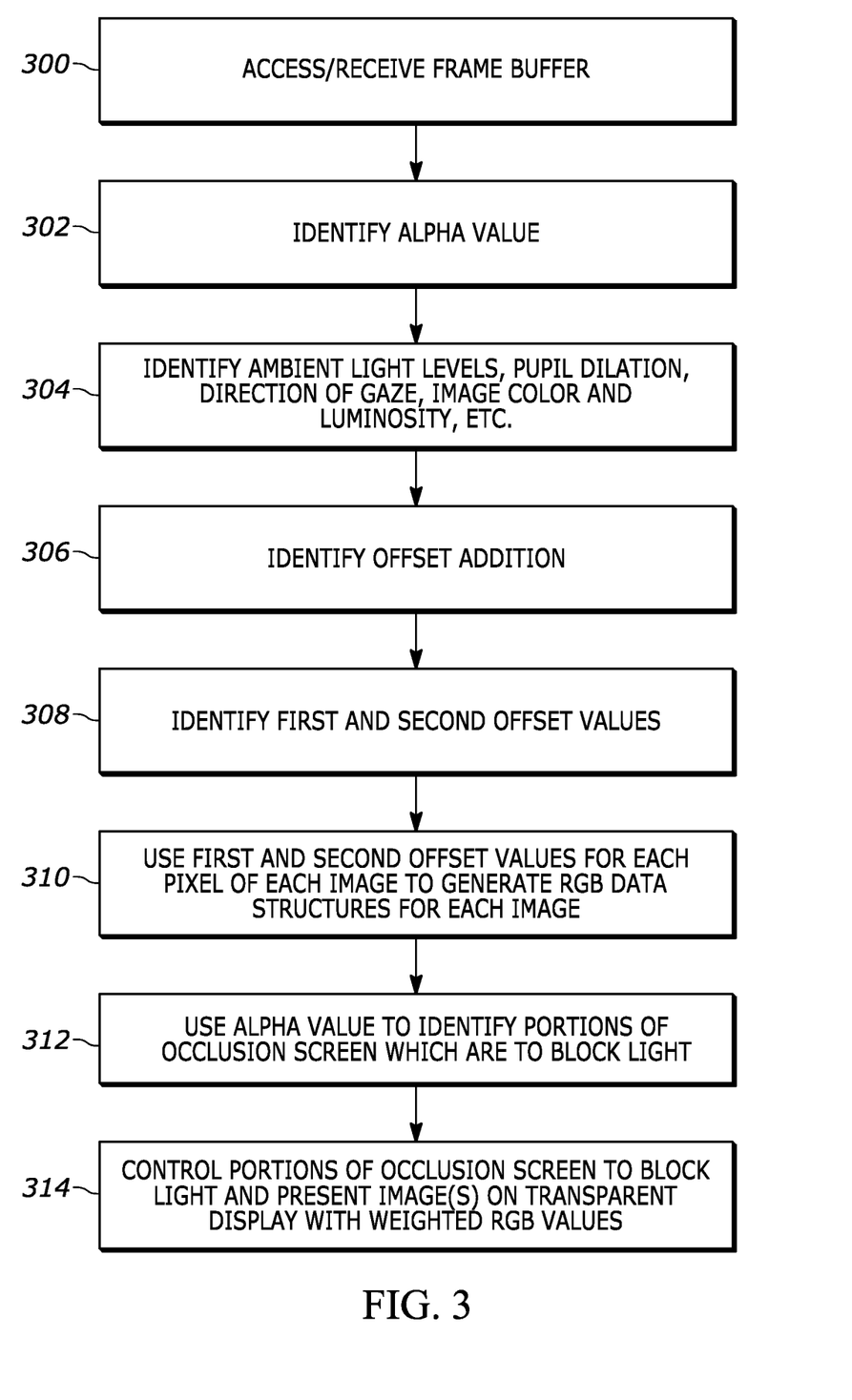
FIG. 3 is a flowchart of an example algorithm consistent with present principles.

Now in reference to FIG. 3, example logic executable by a processor within a headset such as the CE device 46 is shown, though the logic of FIG. 3 may be executed by other types of devices having transparent displays as well (e.g., those positionable on a tabletop). Note that the logic of FIG. 3 may be executed by the headset's graphics processing unit (GPU) or the headset's central processing unit (CPU). However, the logic of FIG. 3 may also be executed by a dedicated processor separate from the GPU and CPU to mostly or only perform the logic reflected in FIG. 3 to reduce latency in virtual image rendering while leaving other processing tasks to the CPU/GPU. The dedicated processor may be, for example, an application-specific integrated circuit (ASIC) or a field-programmable gate array (FPGA). The logic of FIG. 3 may also be executed at scan out by a digital analog converter (DAC).

Beginning at block 300, the processor may access or receive a frame buffer from the GPU that indicates images that are to be presented on the device's transparent display. The frame buffer may thus include a bitmap for driving the transparent display. As indicated above, the frame buffer may have been provided by the headset's GPU and stored in RAM of the headset prior to rendering of respective images from the frame buffer on the headset's transparent display. In the context of augmented reality (AR) in particular, the frame buffer may be used to render one or more virtual stereoscopic images on the device's transparent display, such as video of three-dimensional (3D) AR content or a static 3D virtual image.

It is to be further understood that included in the frame buffer may be red-green-blue (RGB) values for each pixel of each image to be rendered on the headset's transparent display, as well as respective alpha values for the respective pixels in the alpha channel of each data unit that also indicates the respective RGB values. In some examples, the alpha value may be established by one bit of a thirty two bit data unit (e.g., the integer one or zero). In other examples, the alpha value may be indicated in eight bits of a thirty two bit data unit for a respective pixel of an image that is to be rendered, with the other twenty four bits indicating RGB data for the respective pixel. Accordingly, at block 302 of FIG. 3 the alpha values in the alpha channel may be received or identified from the GPU, or otherwise accessed at the frame buffer stored in RAM. Also, note that the alpha values themselves may have been determined or preprogrammed by a content developer when developing or providing the virtual images/content itself that is to be presented at AR headsets.

From block 302 the logic may then proceed to block 304. At block 304 the headset may identify one or more of ambient light levels in the headset's environment, the amount of dilation of the pupils of the person wearing the headset, the direction and depth of gaze of the person wearing the headset, and/or the color and luminosity of the virtual image(s) from the frame buffer that are to be rendered on the headset's transparent display. Ambient light levels may be identified using a silicon photo diode or a camera such as the scene camera 45 of FIG. 2. The amount of dilation of the pupils as well as the direction and depth of gaze may be identified by executing eye tracking software using images from a camera imaging the person's eyes, such as the camera 204 of FIG. 2.

Also note that in addition to or in lieu of using a photo diode or camera for identifying ambient light levels, ambient light levels may be identified based on the identification of the person's pupil size(s) (e.g., pupil radius, circumference, and/or area) since a relationship exists between pupil size and ambient light level (the smaller the pupil size, the more the ambient light that exists within the person's environment). Thus, a relational database may be accessed to determine ambient light level based on a determined pupil size, or even a combined light level of both ambient light and virtual image light based on a determined pupil size which may then be used consistent with present principles.

As for the color and luminosity of the virtual image itself that is to be rendered on the headset's transparent display, color and luminosity may be identified from the RGB image data itself in the frame buffer.

The logic of FIG. 3 may then proceed to block 306 where an offset addition for each pixel of each virtual image to be rendered on the headset's transparent display may be determined based on the identification(s) at block 304. The offset addition may be referred to below as "A_offset". The offset addition may be determined using one or more of the ambient light levels in the headset's environment identified at block 304, the dilation of the pupils of the person wearing the headset identified at block 304, the direction and depth of gaze of the person wearing the headset identified at block 304, and/or the color and luminosity of the virtual image itself that is to be rendered on the headset's transparent display from the frame buffer identified at block 304. Where ambient light level alone is used, such as generalized ambient light level for the headset's environment, the offset addition may be determined using a function designed to result in a number that would increase the luminance of the respective pixel itself to be brighter than the ambient light level (or at least perceptible to a person given the current ambient light level), e.g., by a preset luminance amount determined by the headset's developer. Where dilation of the pupils is used to determine ambient light level, ambient light level may first be determined from pupil size as disclosed above and then the determined ambient light level may be used according to the preceding sentence to determine the offset addition using the function designed to result in a number that would increase the luminance of the respective pixel to be brighter than the ambient light level (or at least perceptible to a person given the current ambient light level).

In examples where the direction and depth of gaze of the person wearing the headset is used, eye tracking using an inward-facing camera on the headset (e.g., the camera 204) that images the person's eyes may be used to determine the direction and depth of gaze to then determine a localized light level for the real-world in the direction and depth of the person's gaze. Thus, camera input from an outward-facing camera (e.g., the scene camera 45) may be used to map the direction and depth of gaze to real-world locations in the person's field of view shown in images from the outward facing camera to identify light levels/luminosity at the gazed-at real-world location(s). An offset addition(s) for luminosity may then be determined for a portion of the virtual image that is to be presented on the headset's transparent display at display locations intersecting the direction of gaze. In this example, the offset addition may be determined using a function designed to result in a number that would increase the luminance of the respective pixels at the display locations of eye gaze intersection to be brighter than the localized light levels at the real-world location(s) being gazed at (or at least perceptible to a person given the current ambient light level), e.g., by the preset luminance amount discussed above. Thus, for example, if the person were looking toward an illuminated light bulb, the offset addition may indicate higher luminance addition is to be used for certain pixels of a virtual image that are presented in the person's line of sight to the light bulb, whereas if the person were looking toward a wall only reflecting ambient light then the offset addition may indicate a relatively lower luminance addition.

The logic of FIG. 3 may then proceed from block 306 to block 308. At block 308 a first offset value for each pixel of each virtual image from the frame buffer that is to be rendered on the headset's transparent display may be determined. The first offset value for each image pixel may be based on the respective offset addition for each image pixel that was identified at block 306 as well as the respective alpha value for each respective image pixel indicated in the frame buffer itself as identified at block 302. The first offset value may be given by $f(A)=t((A-A\_offset)/(1-A\_offset))$, where A_offset may be the offset addition for a respective image pixel, A may be the identified alpha value from the frame buffer for the respective image pixel, and t may be a linear or curve function (such as an arbitrary gamma curve function) determined by the headset's developer. For example, $t(x)=X^Y$, as in $t(x)$ may equal X (as luminance) to the power of Y. Y may be the integer one or some other value to realize a curve. As another example, an sRGB (standard RGB) gamma curve function may be $t(x)=X^{1/2.4}+A\_offset$.

Also at block 308, a second offset value for each pixel of each virtual image to be rendered on the headset's transparent display may also be determined. The second offset value may be used to adjust the RGB luminance of a given pixel depending on its transparency as indicated by the accompanying alpha value for the respective pixel. The second offset value may be given by $g(A)=A*A\_offset$ (A multiplied by A_offset), where A may be the identified alpha value from the frame buffer for the respective image pixel and where A_offset may be the offset addition for the given image pixel.

Thus, for example, if the alpha value were the integer one (denoting a fully opaque pixel), then $g(A)=A\_offset$. If the alpha value were less than one but greater than zero (denoting a semi-transparent pixel), $g(A)$ would degrade proportionally to the transparency using the equation $g(A)=A*A\_offset$.

From block 308 the logic may then proceed to block 310. At block 310 the first and second offset values for each image pixel of each image that were identified at block 308 may be used as weights to generate respective adjusted RGB data structures for each image relative to the respective RGB data structures as initially received/identified from the frame buffer. To do so, each respective final RGB value of an adjusted data structure for a given image may be given by $RGB\_final=RGB\_framebuffer*(f(A)+g(A))$. Stated another way, each final RGB value for a given pixel in the data structure may be determined by taking the RGB value for the pixel identified from the frame buffer itself and multiplying it by the sum of the first offset value ($f(A)$) and the second offset value ($g(A)$).

The adjusted data structures may then be encoded according to whatever standard the headset is already configured to use for display output so that virtual images may be presented on the headset's transparent display at block 314 according to the respective final RGB values.

However, also note that in some implementations the logic may first proceed to block 312 from block 310 rather than proceeding directly to block 314 from block 310. At block 312 the alpha value for each image pixel as identified at block 302 may be used to identify portions of an occlusion screen (such as the screen 200) that are to block external visible light from passing through those portions, or at least light of a certain color of some combination of red, green, and blue. Assuming the occlusion screen is closely juxtaposed or layered with the transparent display itself, there may be a one-to-one mapping of pixels for the occlusion screen with pixels of the transparent display so that X-Y coordinates are essentially common between them.

Thus, alpha values of zero may be used to determine that respective image pixels for a virtual image as presented on the transparent display are to be transparent and therefore corresponding coordinates of the occlusion screen may be controlled to be transparent so that light may pass therethrough, whereas alpha values greater than zero and up to one may be used in some examples to determine that respective image pixels for the virtual image are to be only semi-transparent (alpha value more than zero, less than one) or fully opaque (alpha value of one) and therefore corresponding coordinates of the occlusion screen may be controlled to be semi-transparent or opaque so that only some or no ambient visible light, respectively, may pass therethrough.

Furthermore, in some examples the occlusion screen may include red, green, and blue color filters for each pixel in addition to liquid crystals and polarizers, and thus certain colors of ambient RGB light may be blocked by selectively using a certain color filter(s) while another color(s) of light may be allowed to pass through the same respective pixel of the occlusion screen. In essence, a certain color of light from the person's ambient lighting environment may be subtracted from certain areas of the person's field of view that indicate that color of light using corresponding portions of the occlusion screen located in the direction of that color of light relative to the person's eyes. This may help make a virtual image presented on the headset's transparent display more perceptible to the person in examples where the color of the ambient light that might be identified is the same or similar (e.g., slightly different hue) to the color of a certain portion of a virtual image that is to be presented on the headset's separate transparent display in the direction of that ambient light.

It may thus be appreciated that present principles apply to graphics rendering using offset values not just for black image coloring but for other image coloring as well. For example, if red ambient light exists in the direction of the person's gaze and a portion of a virtual image is to be presented in red image color in the direction of the person's gaze, blue and/or green color filters of the occlusion screen for corresponding pixel(s) in the direction of the person's gaze may be used to filter out the red ambient light.

Accordingly, after identifying portions of the occlusion screen that are to block light at block 312, the logic may proceed to block 314 where the occlusion screen may controlled accordingly.

With FIG. 3 now having been described, it may be appreciated that because many display encoders simply ignore the alpha value/channel during image rendering regardless of whether the display being used is a non-transparent television or transparent headset display or even something else, the alpha channel may be repurposed and used for AR graphics rendering of black coloring and even other RGB coloring such as red or blue. Thus, if the RGB values for a given pixel of a given virtual image were all zero but the alpha value for that pixel was greater than zero, offset values/weights for all pixels of that virtual image may be dynamically determined to shift the color space/gamut for that virtual image to increase the luminosity of the virtual image. This may result in the rendering of, e.g., otherwise opaque black on a transparent display as gray coloring by shifting the 0,0,0 RGB value for black coloring up to a dark gray so that the dark gray coloring is perceptible to a person viewing the transparent display as black or near black, psychologically speaking. Without offset value(s) for the black-colored image pixel(s) being used, the transparent display would simply be transparent at the respective display pixels that would otherwise present the black coloring of the virtual image, with no portion of the virtual image being perceptible at those display pixels since the luminosity would be zero owing to the 0,0,0 RGB values for those pixels. Hence, the person would simply see through the transparent display where the person should be seeing a portion of the virtual image itself in black coloring.

Figure 4:
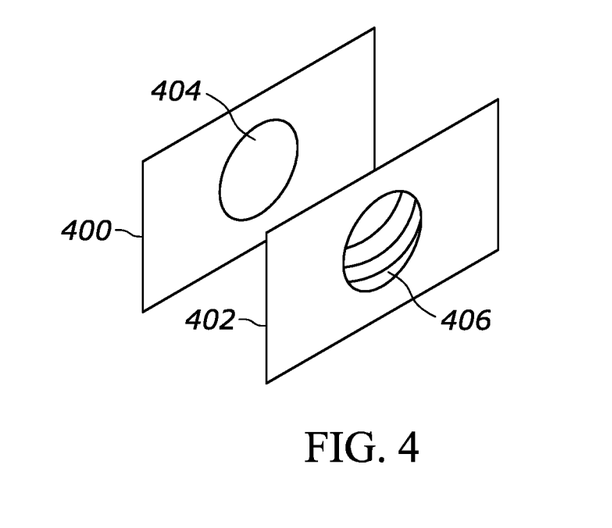
FIG. 4 is an exploded view of a occlusion screen and transparent display of a headset used to render complimentary virtual images consistent with present principles.

Now describing FIG. 4, it shows an exploded view of a occlusion screen 400 and transparent display 402 of a headset as used to render complimentary images to present a three-dimensional virtual object/image to a user of the headset. In this case, the virtual object/image is a sphere. It is to be understood that although the screen 400 and display 402 are shown spaced from each that this is for illustration and that the two may be closely juxtaposed or even abutting in parallel planes or abutting as different layers in the same shape. Thus, X-Y coordinates may be common and shared among the screen 400 and display 402.

Accordingly, images 404, 406 of the same radius may be presented that correspond to the same 3D virtual object (the sphere) that is to be rendered on an AR headset from a frame buffer. The occlusion screen 400 may be controlled by the headset by deactivating/not activating polarizers for certain pixels at the same X-Y locations as those for the transparent display location at which the image 406 is to be presented on the transparent display 402. Other polarizers for other pixels of the occlusion screen 400 may remain activated with current to allow light to pass through those pixels. Furthermore, in examples where the occlusion screen 400 might not be monochrome but might include RGB color filters, sub-pixels of the occlusion screen 400 corresponding to the various color filters may be controlled to filter out some colors of light in the visible light spectrum from passing through various parts of the occlusion screen 400. This may allow the user of the headset to still view real-world surroundings around the virtual object while all or some colors of light are blocked from traveling through portions of the occlusion screen 400 having X-Y coordinates that are the same as X-Y coordinates on the transparent display for where the virtual image 406 is being rendered, thus providing greater contrast for viewing of the image 406. For example, if all external ambient light were blocked from passing through certain X-Y coordinates of the occlusion screen as indicated in an occlusion screen data structure generated by the processor undertaking the logic of FIG. 3, this may give the impression of black coloring for one or more portions of the image 406 at parallel X-Y coordinates of the transparent display even if the transparent display 402 itself presents those portions as transparent rather than having any coloring.

Figure 5:
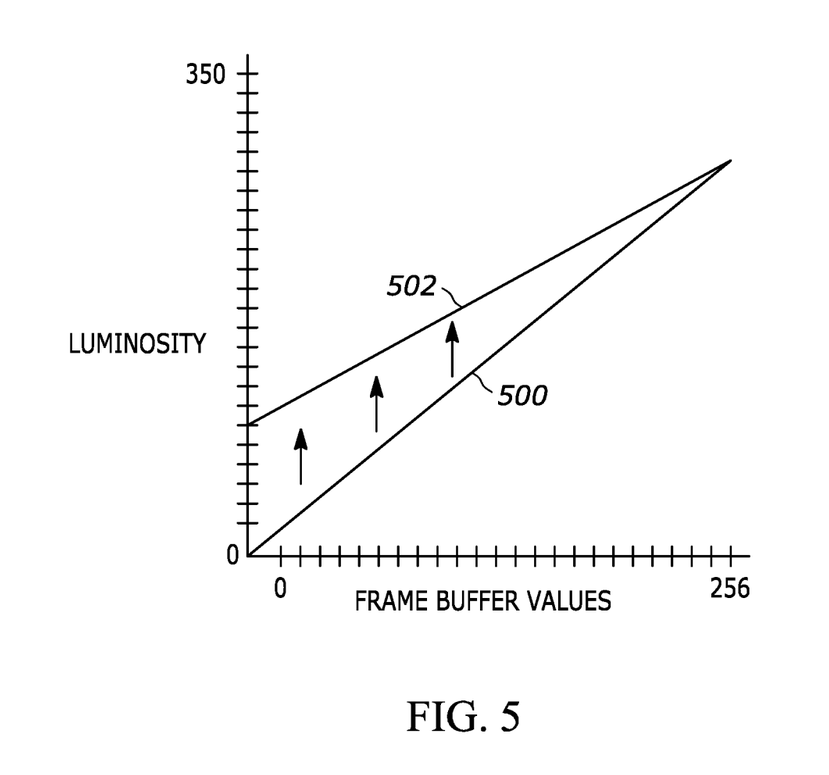
FIG. 5 is a graph demonstrating the remapping of the luminosity of RGB values from a frame buffer based on weights/offset values consistent with present principles.

Continuing the detailed description in reference to FIG. 5, it shows a graph of the remapping of the luminosity of RGB values from a frame buffer based on weights/offset values as disclosed herein. The X axis indicates RGB frame buffer values in ascending order, left to right. The Y axis indicates luminosity in ascending order, down to up. Line 500 indicates luminance for various RGB values as might be presented by a headset without undertaking present principles, whereas line 502 indicates adjusted luminance for various RGB values as might be presented by a headset executing the logic of FIG. 3. It may also be appreciated from this graph that while various RGB color values may have their luminosity increased, the luminosities for the lines 500 and 502 converge at greater RGB values.

Figure 6:
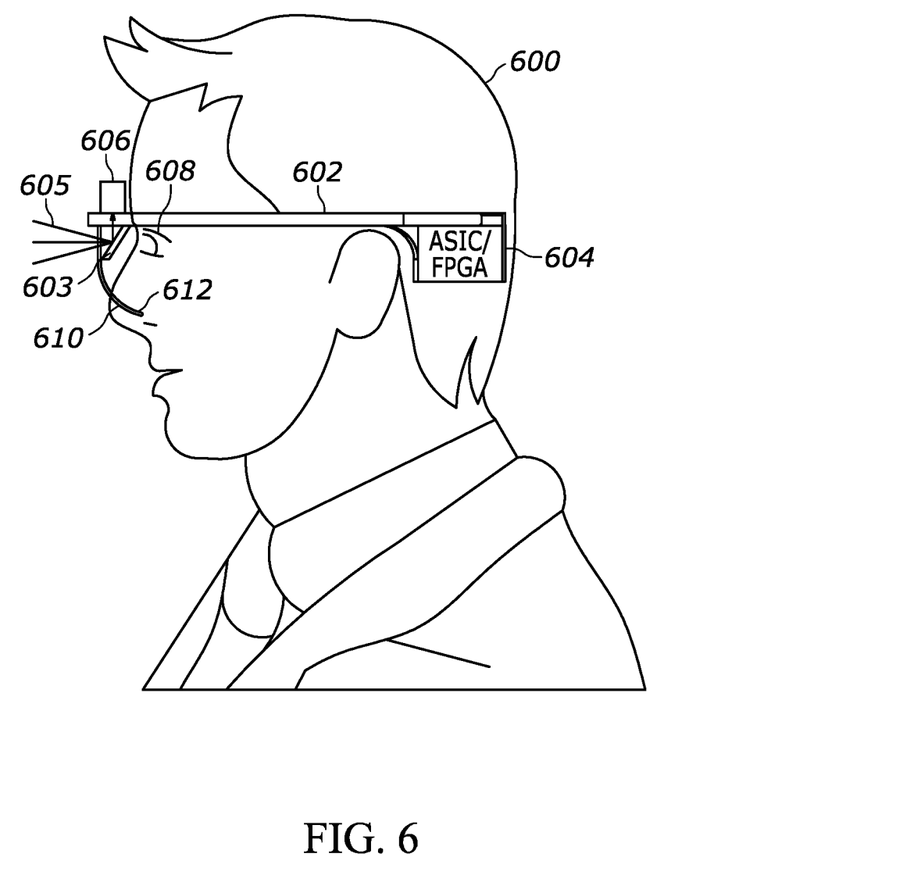
FIG. 6 is a side elevational view of a person wearing a headset configured to operate consistent with present principles.

Turning now to FIG. 6, it shows a side elevational simplified block diagram of a person 600 wearing a headset 602 configured to operate consistent with present principles. The embodiment of FIG. 6 may be used to determine light color and intensity/luminance in the person's direction of gaze. As shown, the headset may include a processor/chip 604 such as an application-specific integrated circuit (ASIC) or field-programmable gate array (FPGA) that may be dedicated to executing the logic of FIG. 3 while other tasks may be assigned to the headset's main central processing unit (CPU) and/or graphics processing unit (GPU) (not shown).

The headset 602 may also include a camera 606. The camera 606 may receive light 605 reflected off a half mirror 603 proximate to (e.g., slightly above) the person's eyes 608 after the light 605 passes through the both the headset's occlusion screen 610 and transparent display 612. By using the light 605 reflected off the mirror 603 as captured by the camera 606, the headset may determine color and light intensity in the direction of the person's gaze for use in accordance with the logic of FIG. 3. The mirror 603 may even be motorized to reflect light from different directions corresponding to the user's direction of gaze in the real-world field of view by executing eye tracking software to determine the direction and orienting the mirror 603 to reflect light from the same direction in all three dimensions.

However, also note that while FIG. 6 shows one example embodiment, color and light intensity of ambient light may be determined in still other ways consistent with present principles. For example, cameras disposed on sides of the headset and oriented outward for simultaneous localization and mapping (SLAM) tracking, getting depth data, or for hand tracking and scene tracking for AR may be used not just for those purposes but for identifying color and light intensity by assuming that the field of view of those cameras is the same as the person's actual field of view.

Note that VR/AR headsets framebuffers can be distorted in a way to cancel the distortion and color aberration caused by the optics, at the last step on the GPU. In some embodiments present techniques for color transparency correction may be done in conjunction with the distortion such that both may be implemented together in a single function block on a single chip.

It will be appreciated that whilst present principals have been described with reference to some example embodiments, these are not intended to be limiting, and that various alternative arrangements may be used to implement the subject matter claimed herein.

What is claimed is:

1. An augmented reality (AR) display system, comprising:
    at least one display;
    at least one processor configured with instructions which when executed by the processor configure the processor to:

receive at least a first red-green-blue (RGB) frame buffer;

generate a final RGB data structure by multiplying the first RGB frame buffer by at least a first offset value, the first offset value comprising an offset addition determined using one or more of ambient light level, dilation of pupils of a person, direction of gaze of the person, color and luminosity of a virtual image represented at least in part by the RGB frame buffer, the first offset value further comprising an alpha value indicating at least in part a display opacity; and present on the display graphic information according to the final RGB data structure.

2. The AR display system of claim 1, wherein the first offset value is added to a luminosity of at least a first pixel.

3. The AR display system of claim 2, wherein the first offset value is given by $f(A)=t((A-A\_offset)/(1-A\_offset))$, wherein A_offset is the offset addition, A comprises the alpha value in the first RGB frame buffer, and t is a curve function.

4. The AR display system of claim 3, wherein t comprises a gamma curve function.

5. The AR display system of claim 1, wherein the instructions are executable to generate the final RGB data structure by multiplying the first RGB frame buffer by the sum of the first offset value and a second offset value.

6. The AR display system of claim 5, wherein the second offset value g(A) is given by:

A multiplied by A_offset, wherein A is an alpha value of at least a first pixel, and A_offset is an addition that is added to a luminosity of the first pixel responsive to identifying that the first pixel is not completely opaque.

7. The AR display system of claim 1, wherein for at least a first pixel in the first frame buffer RGB information represents opaque black with RGB=0 and A=1, wherein A comprises an alpha value, and wherein a luminosity of the final RGB data structure for the first pixel is equal to an offset from the alpha value.

8. The AR display system of claim 1, wherein the processor comprises at least one graphics processing unit (GPU).

9. The AR display system of claim 1, wherein the processor comprises at least one an application-specific integrated circuit (ASIC) and/or a field-programmable gate array (FPGA).

10. The AR display system of claim 1, comprising an occlusion screen that comprises pixels that are controllable to transition at least a portion of the occlusion screen between transparent and opaque.

11. The AR display system of claim 10, wherein the instructions are executable to:

generate an occlusion screen data structure based on the first offset value; and control the occlusion screen according to the occlusion screen data structure.

12. The AR display system of claim 11, wherein the occlusion screen data structure is controlled to block light from passing orthogonally from outside the occlusion screen through portions of the at least one display that represent black coloring of the final RGB data structure.

13. A method, comprising:

identifying, at a device comprising a transparent display, a weight by which at least a first red-green-blue (RGB) value of a frame buffer is to be adjusted, the weight identified based on an alpha value indicated in the frame buffer, the alpha value related to whether at least a portion of a first image to be presented on the transparent display is to represent black coloring;

adjusting at least the first RGB value based on the weight; and rendering, on the transparent display, the first image according to the adjusted first RGB value.

14. The method of claim 13, wherein the first RGB value is adjusted to render black coloring as gray coloring.

15. The method of claim 13, wherein the device comprises an occlusion screen, the occlusion screen being different from the transparent display, and wherein the method comprises:

controlling the occlusion screen to block at least some light from passing through the occlusion screen during rendering of the first image using the adjusted first RGB value.

16. An apparatus, comprising:

at least one computer storage that is not a transitory signal and that comprises instructions executable by at least one processor to:

identify an alpha value related to presentation of at least a first image, the alpha value identified at least in part from a frame buffer, the alpha value being in a range of zero to one inclusive and representing a desired display opacity; and based on the alpha value, control one or more of a transparent display of a device and an occlusion screen of the device to render the first image at the device with coloring perceptible to a person using the device.

17. The apparatus of claim 16, wherein the instructions are executable to:

based on the alpha value, control the transparent display of the device to render the first image with coloring perceptible to a person using the device by mimicking black image coloring with gray image coloring.

18. The apparatus of claim 16, wherein the instructions are executable to:

based on the alpha value, control the occlusion screen of the device to render the first image with image coloring perceptible to a person using the device by blocking light from passing through at least a portion of the occlusion screen.

19. The apparatus of claim 16, comprising the transparent display and comprising the occlusion screen.

20. The apparatus of claim 19, comprising the at least one processor, the at least one processor dedicated to executing the instructions and being separate from both a central processing unit (CPU) of the device and graphics processing unit (GPU) of the device.

* * * * *